United States Patent Office 3,506,314
Patented Apr. 14, 1970

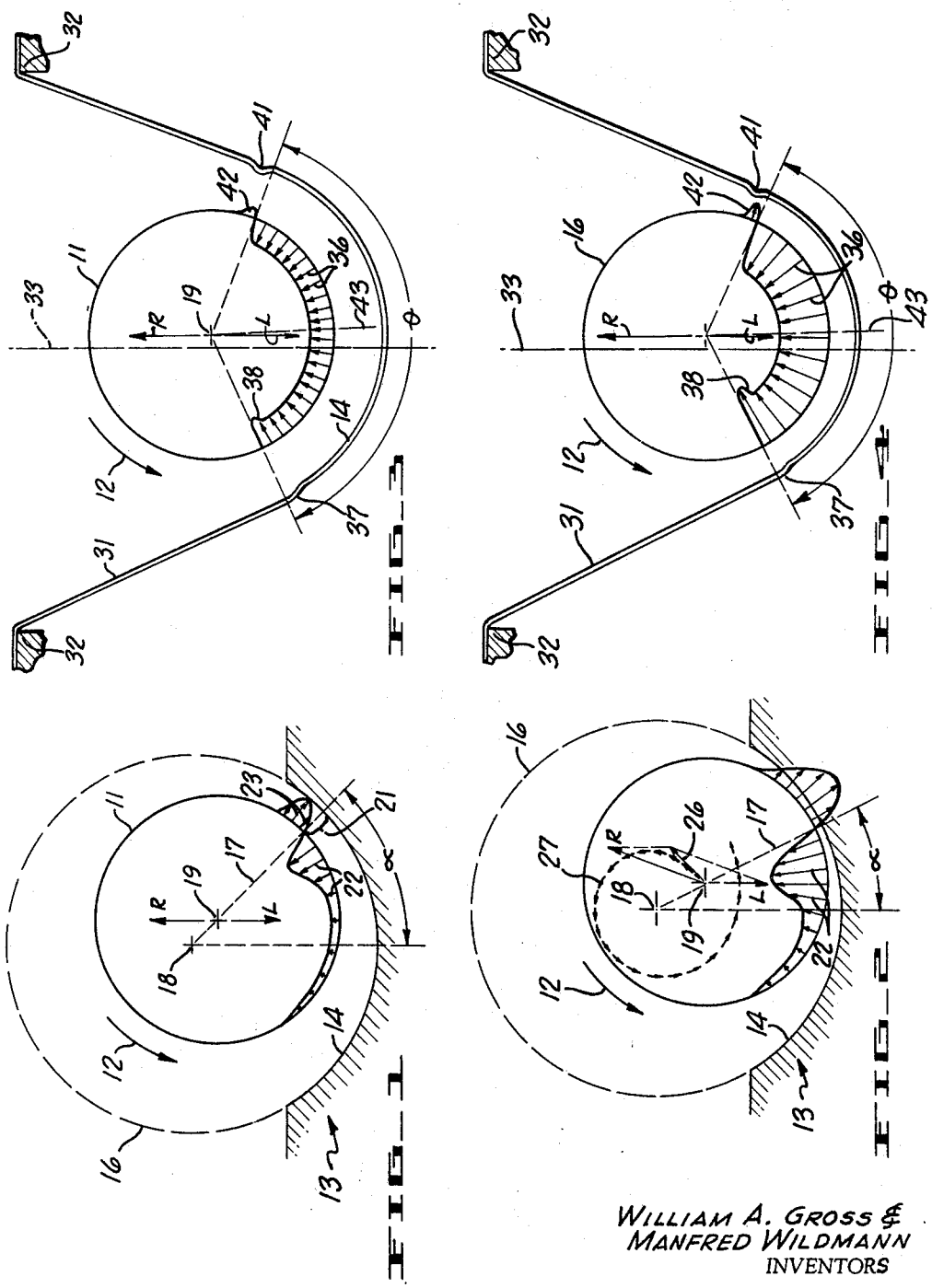

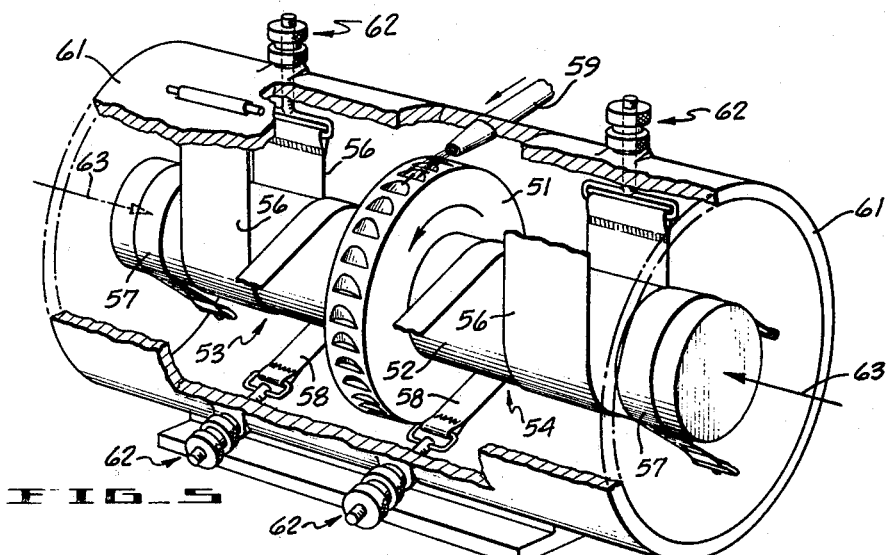
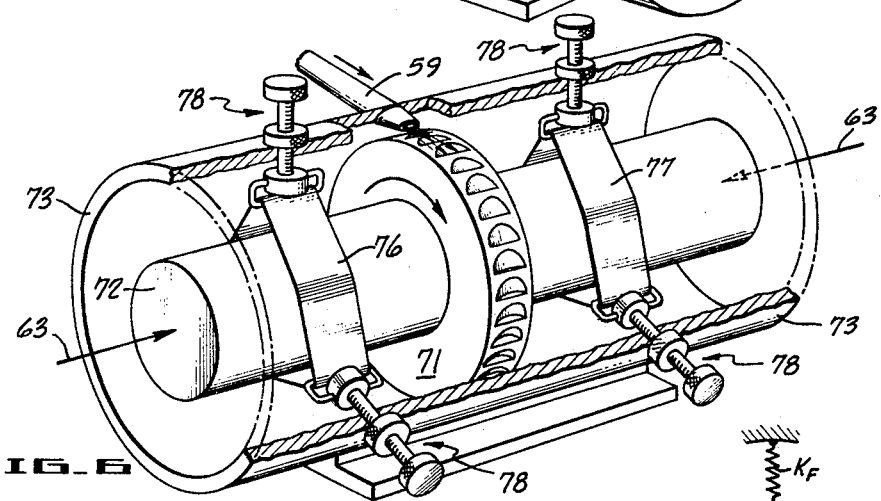
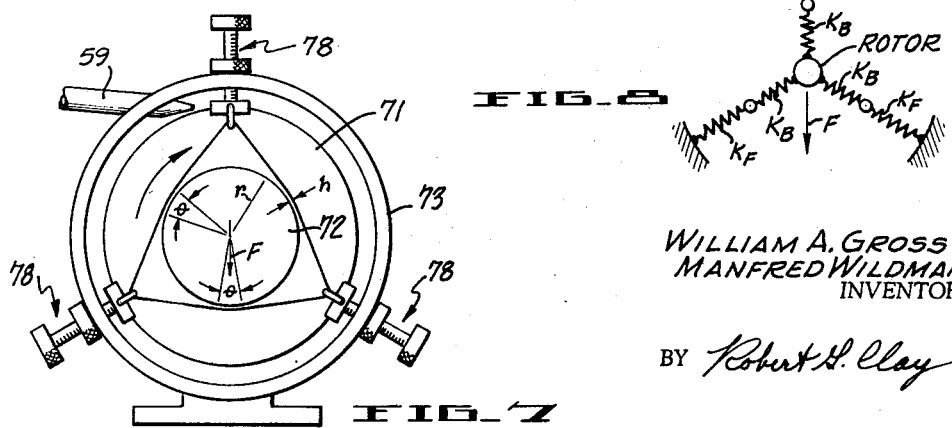

3,506,314
FLUID BEARING
William A. Gross, Los Altos Hills, and Manfred Wildmann, Menlo Park, Calif., assignors to Ampex Corporation, Redwood City, Calif., a corporation of California
Filed Aug. 7, 1964, Ser. No. 388,072
Int. Cl. F16c 17/16
U.S. Cl. 308—9   9 Claims This invention relates to fluid bearings, and particularly to such bearings in which a rotating shaft is journaled by means of flexible foils.

In fluid journal bearings previously known, a solid rotating shaft is supported on a bearing surface by means of an intervening cushion or "film" of pressurized fluid. The fluid may be a gas, such as air, introduced to the bearing under pressure, or alternatively the gas may be pressurized by the action of the rotating shaft. Such gas bearings have the advantage of reducing frictional resistance and noise to a minimum and eliminating wear of the parts. However in most such bearings there is a tendency of the shaft to orbit or "whirl" about the center of curvature of the bearing surface, or some other point, which action may consequently result in impact between the shaft and bearing surface causing "catastrophic" failure of the bearing.

It has previously been proposed to provide a bearing surface formed by a tensioned flexible foil as a convenient bearing. See for example, proposals noted and discussed in pages 138–141 of "Gas Film Lubrication" John Whiley and Sons, Inc., New York, 1962, by William A. Gross. However, the construction of such a bearing to eliminate "whirl" has not been previously considered. Furthermore, many problems involved in the actual construction of such bearings have not previously been dealt with: for example, the problem of arranging the foil to confine the shaft on all sides, particularly in an environment in which gravitational forces have been neutralized; and also the problem of correctly tensioning the foil.

Accordingly, it is an object of the present invention to provide a fluid bearing for a rotating shaft in which the tendency of the shaft to whirl is eliminated as a cause of bearing failure.

It is another object of the invention to provide a foil bearing accomplishing the above object and suitable for confiining the shaft on all sides.

It is a further object of the invention to provide a foil bearing as above described and adapted for correct tensioning of the foil and adaption to alignment of the shaft.

These and other objects are accomplished in a structure in which a plurality (preferably at least three) segments of foil are looped around corresponding, equi-angularly spaced, peripheral zones of the shaft, and the ends of each of the segments are coupled to a base or frame and are tensioned, at least during the rotation of the shaft.

A better understanding of the invention may be had by reference to the following description, taken in conjunction with the accompanying drawings, in which:

FIGURE 1 is a schematic view illustrating the operaation of a conventional gas bearing;

FIGURE 2 is a schematic view further illustrating the operation of a gas bearing;

FIGURE 3 is a schematic view illustrating the operation of a foil bearing;

FIGURE 4 is a schematic view further illustrating the operation of a foil bearing;

FIGURE 5 is a perspective view of an assembly of foil bearings in accordance with the present invention;

FIGURE 6 is a perspective view of a variational form of a foil bearing in accordance with the present invention;

FIGURE 7 is an end elevation view of a foil bearing in accordance with the invention; and FIGURE 8 is a schematic view illustrating the operation of the invention.

To make clear the advantages of the present invention, the description thereof is prefaced as follows by a brief mention of the phenomenon of "whirl" in gas bearings previously known in the art. The discussion is not meant to be definitive of the phenomenon but merely to illustrate some of the conditions under which whirl may be generated. In FIGURE 1 there is shown a shaft 11 rotating in the direction of the arrow 12 and supported by a bearing 13 having a curved bearing surface 14. While the bearing surface 14 may extend entirely around the shaft as illustrated by the dashed circle 16, it is here shown as extending through an arc of about 120°, it being understood that whirl of the shaft may be generated in substantially the same manner whether or not the bearing surface extends entirely around the shaft. For the sake of clarity, also, the average difference in radius between the shaft 11 and bearing surface 14 is very much exaggerated, it being not uncommon for this average difference in radius to be only .001 to .0001 of the radius of the shaft. Because the radii are different, a line 17 drawn through the center of curvature 18 of the bearing surface 14 and the axis 19 of the shaft will always pass through a zone 21 at which the clearance between the shaft and bearing surface is a minimum. As the shaft rotates, the effect of the surface friction on the gas (e.g., air) within the bearing tends to drive the air in the direction of rotation and in a converging channel toward the zone 21, so that the air is compressed and forms a supporting film or pad that maintains the shaft out of engagement with the bearing surface 14. The direction and magnitude of air pressure forces acting on the shaft are illustrated schematically by the vectors 22 extending from the periphery and toward the axis of the shaft. When the moving compressed air passes the zone 21, the channel defined by the surfaces of the shaft and bearing diverges, and the air begins to expand, causing suction or subambient pressure forces, shown by the vectors 23, to act on the shaft. For stable positioning of the shaft in rotation, the resultant R of all of the vectors 22, 23 must be equal in magnitude and opposite in sense to the force L representing for example the radial load imposed on the shaft by gravitational forces. Since the vector forces 22, 23 are unequally distributed on either side of the line 17, the shaft tends to seek a state of equilibrium in which the line of centers 17 is displaced angularly from a vertical line through the point 18 by an angle α, commonly referred to as the "attitude angle," so that the resultant force R is directed oppositely to the load force L. Also the radial displacement of the shaft axis 19 from the center 18 is a function of the magnitude of the load L because, as will be readily seen, the clearance between the shaft and bearing surface determines the air pressure acting on the shaft, which in turn determines the magnitude of the resultant force R that must balance the load L at a condition of equilibrium. If the elements of the structure were perfectly formed and balanced, and if the apparatus were entirely insulated from external shocks and vibrations, and furthermore if the rotational speed were never altered, the shaft 11 might rotate indefinitely with its axis 19 stably positioned as illustrated. However such conditions are not obtainable in practice, and the slightest disturbance may be sufficient to initiate the whirling motion illustrated in FIGURE 2. In this figure it has been assumed that the shaft has been moved vertically downward as by a transitory external shock, for example, as by being tapped near its uppermost point. The external shocking force has been removed and the shaft is about to rebound upwardly again because of the increased air pressure induced by the narrowing of the clearance between the shaft and the bearing surface. However, it will be seen that upon movement downward of the shaft, the angle α between the vertical and the line 17 of centers has decreased, and the center of pressure of the forces 22, 23 has moved clockwise. In other words, the resultant force R of the air pressure has increased in magnitude and has shifted in a clockwise direction as illustrated in the figure. The resultant force of the two forces R and L, illustrated by the vector 26, thus induces the shaft to rebound, not straight up, but in a direction markedly counter-clockwise with respect to the center of curvature 18. However as the shaft begins to move, the angle α increases and the force R and resultant 26 concurrently swing in a counter-clockwise direction around the shaft axis 19, and the axis 19 therefore follows a curved path as indicated by the arrows 27. In a completely encompassing bearing as illustrated by the circle 16; the path 27 may encircle the center of curvature 18, and while in some bearings with carefully adjusted parameters and at certain rotational speeds the axis 19 may eventually return to its stable position, it is commonly experienced that the path 27 can follow an expanding spiral until the surface of the shaft strikes the bearing surface 14 with a catastrophic impact, and the bearing and the shaft are damaged or destroyed. It will be appreciated that the initially disturbing force may not be isolated, but may recur with a certain rhythm as occasioned by external vibrations or by mechanical imbalance in the rotating parts. The great difficulty of designing a bearing of this type that will return to stability under all desired operating conditions makes bearings subject to such instabilities of extremely limited utility.

A foil bearing such as is illustrated in FIGURES 3 and 4 owes its stability in part to the ability of the bearing surface 14 to shift and to flexibly conform to incipient or actual changes in the location of the shaft axis 19.

As shown in FIGURE 3, the foil 31 is arranged as a sling to suport the shaft 11 and is anchored at both ends to base or framework elements 32, which are horizontally spaced at equal distances from a center line 33. When the shaft is turned, the foil 31 has a segment, designated by the angle θ, that is looped or wrapped about a corresponding peripheral zone of the shaft and is spaced therefrom by the supporting air film for a substantially constant clearance, the air pressure indicated by the vectors 36 also being substantially constant throughout the zone of support. It has been found in practice that at the entrance zone where the air is first compressed, the foil 31 has a slight bulge 37 in response to a very slight excess pressure 38, and that at the exit zone where the air begins to expand, the foil has a slight sinusoidal-like reverse bulge 41 corresponding to a very small suction pressure 42. With the shaft supported in an equilibrium condition, this very slight imbalance in the pressure forces may result in a very small rotation of the line 43, that bisects the angle of wrap θ, in the direction of rotation of the shaft, and a very slight displacement of the shaft axis 19 from the center line 33 as shown in the figure, with the result that the resultant R of the pressure forces is equal in magnitude to and is oppositely directed with respect to the load L. The imbalance of the forces about line 43 and the displacements involved are very much smaller in proportion to the total pressure forces than is the case with the solid journal bearing of FIGURE 1, and for most practical purposes, these displacements in a foil bearing can be neglected. However, even when these displacements are taken into account, it will be seen that the foil bearing is stable against whirl. In FIGURE 4 is shown a condition analogous to that of FIGURE 2 in which the shaft has been moved sharply downward by a transient exterior disturbance so that the clearance between the shaft and foil is decreased and the pressure forces 36 are very much increased. It will be seen that the supporting segment of foil has conformed to a new and smaller radius of curvature corresponding to a supporting sector having a slightly smaller angle θ, but that the line 43 bisecting the angle θ has not been rotationally displaced. Of course, the pressure imbalances 38 and 42 have increased only substantially proportionally with the balanced pressures 36, so that the resultant R of the pressure forces still points directly upward and oppositely to the direction of load L. The resultant R is momentarily of greater magnitude than the load L with the result that the shaft 16 moves directly upwardly after removal of the transient disturbing force, but does not orbit at a changing angle to the vertical as in the case of the solid bearing of FIGURE 2. Thus the conditions needed to produce whirl are entirely absent.

A foil bearing such as the one shown in FIGURES 3 and 4 gives unidirectional support only. In order to completely restrain a rotor, a total of three supporting foil segments are required for each of two bearings. Several configurations can be used, as illustrated in FIGURES 5–8.

In FIGURE 5 is shown an arrangement suitable for a turbine rotor 51 and shaft 52 having a substantial mass and operating in a gravitational field so as to be subject to a vertical load equal to the weight of rotor and shaft, acting downward perpendicular to the axis thereof. Each of two bearings 53 and 54 includes a main foil bearing 56 supporting the shaft in a vertical plane, and two stabilizing foil bearings 57 and 58 acting at approximately 120° from the main foil 56. The angle of wrap of each foil is approximately 180°, and the main foil 56 is of substantially greater width for supporting the load of the shaft and rotor weight. A compressed air nozzle 59 is mounted to drive the rotor 51. A base is provided in the form of a housing 61. At least one end of each foil strip is anchored securely in the housing 61, while the other end is secured to the housing by means of a tension adjusting screw and lock nut assembly 62. Thrust bearings of conventional design restrain the shaft against endwise motion as indicated by arrows 63.

The configuration of FIGURES 6–8 is useful if the load to be supported is small, such as it would be in an environment in which gravitational forces are neutralized. This configuration has the advantage of simplicity and small starting torque, and is described as follows: a rotor 71 and shaft 72 are mounted in a housing 73 by means of a pair of endless loop foil strips 76 and 77 each of which is secured to the housing at equi-angularly spaced points by means of three tension adjusting screw and lock nut assemblies 78. Each of the foil strips thus has three segments looped about corresponding peripheral zones of the shaft defined by the angles θ (FIGURE 7). The housing 73 may be hermetically sealed and gasses other than air (e.g., argon) may be used.

The foil bearing rotor support of FIGURES 6–8 may be represented as in FIGURE 8 by a model that consists of a rotor mass supported by three equal springs, spaced at 120° intervals around the rotor. The overall stiffness of suport can be determined if the stiffness of each individual support is known. In addition to the stiffness rate needed to determine the natural frequency of the system, the minimum film thickness in the lubricating film, the starting torque, and the running power are required.

For purposes of illustration, the construction of a bearing that is required to support a rotor weighing 10 lbs. and operating at 48,000 r.p.m., in argon, is described as follows:

The stiffness of the bearing shown in FIGURES 6-8 is obtained by treating the foil and the fluid bearing as two springs in series. The spring rate of the foil is obtained from simple geometric considerations.

$$K_F = \frac{F}{\delta} = \frac{2btE}{l} \sin^2 \frac{\theta}{2} \quad (1)$$

where

F is the radial force exerted by the foil on the shaft
$\delta$ is the resulting displacement
$b$ is the foil width
$t$ is the foil thickness
E is the foil modulus of elasticity
$l$ is the foil length
$\theta$ is the wrap angle The stiffness of the fluid bearing is obtained by differentiating the expression given fluid film thickness $h$ as a function of foil tension T. This expression was derived in the text "Gas Film Lubrication," previously referred to, with the assumption that the gap is constant within the foil area. The gap, so given, is $$h = 1.4r \left[ \frac{b\mu U}{T} \right]^{2/3} \quad (2)$$

where U is the tangential velocity of the shaft, $r$ is the radius of the shaft, and $\mu$ is the coefficient of viscosity of the gas.

For the geometry shown, $T = F/(2 \sin \theta/2)$. Solving for F, $$F = \frac{3.31 \cdot r^{3/2} \mu U b}{h^{3/2}} \sin \frac{\theta}{2} \quad (3)$$

The stiffness is obtained by differentiation, $$K_B = -\frac{dF}{dh} = \frac{4.96 r^{3/2} b \mu U}{h^{5/2}} \sin \frac{\theta}{2} \quad (4)$$

The total stiffness of each foil is:

$$K_T = \frac{K_F \cdot K_B}{K_F + K_B} \quad (5)$$

The total stiffness of the entire support system consisting of three foils is obtained by determining the stiffness of three equally spaced springs, or $$K = 1.5 K_T \quad (6)$$

The bearing used for illustration has the following dimensions:

Shaft radius: $r = 2$ in.
Foil width: $b = 2$ in.
Foil thickness: $t = .005$ in.
Foil length: $l = 1$ in.
Wrap angle: $\theta = 10°$
Foil modulus of elasticity: $E = (30)(10^6)$ lbs./in.

In addition, the gap $h$ is to be 0.001 in. With these requirements, the foil stiffness is obtained by substitution into Equation 1, and the bearing stiffness by substitution into Equation 4, giving:

$K_F = (0.455)(10^4)$ lbs./in.
$K_B = (0.172)(10^4)$ lbs./in.

The overall stiffness, from Equation 6, is thus $K = (0.187)(10^4)$ lbs./in.

Two sets of foil bearing supports are necessary to provide torsional restraint, resulting in a total stiffness of $(0.374)(10^4)$ lbs./in. Consequently, under a gravitational influence of, for example, one $g$, the center of the rotor, which has a weight $M = 10$ lbs., is deflected 0.0027 inch with respect to the housing. In a neutralized gravity environment, the total radial forces to which the rotor is subjected result from small acceleration forces due to motion of the vehicle in which the system is mounted, and also unbalance forces due to imperfect balancing of the rotor. The total of these forces normally does not exceed one $g$ or 386 in./sec.², and the foil bearing support used as illustration is clearly adequate.

With this stiffness, the natural frequency is:

$$\omega_n = \frac{1}{2\pi} \sqrt{\frac{2 \cdot K}{M}} = \frac{1}{2\pi} \sqrt{\frac{(0.374)(10^4)(386)}{(10)}} = 61 \text{ c.p.s.}$$

This frequency is much lower than the operating speed of 800 c.p.s. The rotor therefore requires acceleration through the first mode. Because this natural frequency is relatively low, the acceleration is accomplished without damage to the rotor and bearing. Some damping is provided by squeeze film effects in the fluid film bearing and hysteresis in the foils. If additional damping is required, a sandwich structure with an energy absorbing compound between two foils may be used as the flexible support.

Under no external load, the force exerted by the foil on the rotor is given by Equation 3, or $F = 1.15$ lbs.

This can be considered as a "preload" on the foils. The tension in the foil is thus $T = 6.6$ lbs.

The stress in the foil is thus $6.6/(2)(0.005) = 660$ p.s.i., which is very low for steel. Under a one $g$ load, the force can increase to 5 lbs., resulting in stress of 2890 p.s.i., which is still safe. The starting torque is evaluated by noting that before the fluid film is formed, the foil is like a belt wrapped around a cylinder, for which the difference in tension is given by:

$$T_2 = T_1 E^{\beta \theta} \quad (7)$$

where $\beta$ is the coefficient of friction. Furthermore, equilibrium has to be maintained, or $$(T_1 + T_2) \sin \frac{\theta}{2} = F \quad (8)$$

under no external load, F is simply the preload. In the present example, $\beta$ is 0.4, and Equations 7 and 8 are solved simultaneously to give $T_1 = 6.36$ lbs.
$T_2 = 6.84$ lbs.

The starting torque for a total of six foils is:

$(6)(T_2 - T_1) r = 5.75$ in./lbs.

The running torque is equal to the viscous shear in the foil bearing, or, for six bearings, $$(6) \frac{\theta \mu U r^2 l}{h} = 0.277 \text{ in./lbs.}$$

This corresponds to a total power consumption of 158 watts.

The above example shows that a foil bearing rotor support has adequate stiffness, low power consumption, and is free of self-excited whirl.

The flexibility of the support offers other advantages. This flexibility allows the foil to follow the shape of the rotor, requiring lower machining tolerances on the rotor and permitting the foil to expand with the rotor when the rotor dimensions change due to centrifugal forces and thermal expansion. In bearings with rigid surfaces, these expansions can result in bearing failure due to high speed contact between the two bearing members. Elimination of this cause of bearing failure is a major advantage and results in substantial increase in bearing reliability.

Use of foil bearing rotor supports is not limited to the example described, that is support of rotating turbomachinery elements in low gravity environments. In all applications where fluid film bearings, and particularly gas bearings, are presently used, foil bearing rotor supports may be substituted. To name but a few, such applications are: high speed gas compressors using the working fluid as lubricant; rotating optical devices in which ball bearing noise cannot be tolerated; rotating magnetic recording devices, where, again, ball bearing noise is a problem; and high speed centrifuges, where bearing wear and power are limitations.

Thus there has been described a structure in which a plurality (preferably at least three) segments of foil are looped around corresponding, equi-angularly spaced, peripheral zones of a shaft, and the ends of each of the segments are coupled to a base or frame and are tensioned, at least during the rotation of the shaft.

What is claimed is:

1. A fluid bearing comprising:
a rotatable shaft;
a flexible foil element having a plurality of segments concentrically wrapped about corresponding peripheral zones of said shaft, the ends of said segments being coupled to a base; and
rigid means coupled to said foil for applying predetermined tension thereto;
whereby a fluid bearing is established between said shaft and foil element upon rotation of said shaft with respect to said foil element, and said foil and fluid bearing alone absorb the radial operational excursions of said shaft.

2. A fluid bearing comprising:
a rotatable shaft;
a base;
a flexible foil element having at least three segments concentrically wrapped about corresponding peripheral zones of said shaft, said zones being circumferentially equi-spaced, and the ends of said segments being coupled to said base; and
rigid means coupled to said foil for applying predetermined tension thereto;
whereby a fluid bearing is established between said shaft and foil element, upon rotation of said shaft with respect to said foil element, and said foil and fluid bearing alone absorb the radial operational excursions of said shaft.

3. A fluid bearing comprising:
a rotatable shaft;
a base;
a flexible foil element having at least three segments concentrically wrapped about corresponding peripheral zones of said shaft, said zones being circumferentially equi-spaced and lying in the same plane normal to the axis of said shaft, and the ends of adjacent segments being joined and coupled to said base; and
rigid means coupled to said foil for applying predetermined tension thereto;
whereby a fluid bearing is established between shaft and voil element upon rotation of said shaft with respect to said foil element, and said foil and fluid bearing alone absorb the radial operational excursions of said shaft.

4. A journal bearing for a rotatable shaft comprising:
a base;
a flexible foil element having at least three segments adapted to be looped concentrically about corresponding peripheral zones of said shaft, said zones being circumferentially equi-spaced and lying in the same plane normal to the axis of said shaft when mounted therein, the ends of adjacent segments being joined; and
rigid means coupled between said foil element and said base angularly intermediate each adjacent pair of segments for tensioning said foil element.

5. A fluid bearing comprising:
a rotatable shaft;
a base; and
flexible foil means having at least three segments each concentrically wrapped substantially 180 degrees about corresponding peripheral zones of said shaft, the midpoints of said zones being circumferentially equi-spaced and lying in different planes normal to the axis of said shaft, and the ends of said segments being coupled to said base;
whereby a fluid bearing is established between said shaft and foil element upon rotation of said shaft with respect to said foil element.

6. A bearing comprising:
a rotatable shaft;
a base;
at least three flexible foil members each having a segment concentrically wrapped at least part way around said shaft in a predetermined peripheral zones of said shaft, the midpoints of said zones being equi-spaced about the circumference of said shaft, and each of said foil members having two portions extending from said respective segment, with said extending portions being secured to said base; and
rigid means coupled to said foil for applying predetermined tension thereto;
whereby a fluid bearing is established between said shaft and each of said foil segments upon rotation of said shaft with respect to said segments, and said foil and fluid bearing alone absorb the radial operational excursions of said shaft.

7. A fluid bearing comprising:
a rotatable shaft;
a base;
at least three flexible foil members each having a segment concentrically wrapped at least part way around said shaft in a predetermined peripheral zone of said shaft, the midpoints of said zones being equi-spaced about the circumference of said shaft, and each of said foil members having two portions extending from said respective segment, with said extending portions being secured to said base, said foil members being tensioned to maintain said shaft in a predetermined position but free for rotation in said position; and
rigid means coupled to said foil for applying predetermined tension thereto;
whereby a fluid bearing is established between said shaft and each of said foil segments upon rotation of said shaft with respect to said segments, and said foil and fluid bearing alone absorb the radial operational excursions of said shaft.

8. A fluid bearing assembly comprising:
a rotatable shaft;
a base;
at least two bearing assemblies spaced axially on said shaft, each of said assemblies including at least three flexible foil members each having a segment concentrically wrapped at least part way around said shaft in a predetermined peripheral zones of said shaft, the midpoints of said zones being equi-spaced about the circumference of said shaft, and each of said foil members having two portions extending from said respective segment, with said extending portions being secured to said base, said foil members being tensioned to maintain said shaft in a predetermined position but free for rotation in said position; and
rigid means coupled to said foil for applying predetermined tension thereto;
whereby a fluid bearing is established between said shaft and each of said foil segments upon rotation of said shaft with respect to said segments, and said foil and fluid bearing alone absorb the radial operational excursions of said shaft.

9. A fluid bearing comprising:
a rotatable shaft;
a base;
at least three flexible foil members each having a segment concentrically wrapped at least part way around said shaft in a predetermined peripheral zones of said shaft, the midpoints of said zones being equispaced about the circumference of said shaft, and each of said foil members having two portions extending from said respective segment;

one of said extending portions of at least one of said foil members and both extending portions of the remaining foil members being secured to said base; and rigid tensioning means coupled between said base and the other of said extending portions of said at least one foil member;

whereby a fluid bearing is established between said shaft and each of said foil segments upon rotation of said shaft with respect to said segments, and said foil and fluid bearing alone absorb the radial operational excursions of said shaft.

References Cited

UNITED STATES PATENTS

| | | | |
|---|---|---|---|
| 3,434,761 | 3/1969 | Marley | 308—9 |
| 3,434,762 | 3/1969 | Marley | 308—9 |
| 894,063 | 7/1908 | Salenius | 308—147 |
| 1,384,173 | 7/1921 | Wikander | 308—26 |
| 3,215,480 | 11/1965 | Marley. | |

FOREIGN PATENTS 296,132  8/1928  Great Britain.

MARTIN P. SCHWADRON, Primary Examiner

F. SUSKO, Assistant Examiner